United States Patent [19]

Park et al.

[11] 4,051,322

[45] Sept. 27, 1977

[54] ELECTRICAL JUNCTION BOX

[76] Inventors: William Park, 7522 Valjean, Van Nuys, Calif. 91403; Leo A. LeVitre, 20762 Schoolcraft, Canoga Park, Calif. 91306

[21] Appl. No.: 590,950

[22] Filed: June 27, 1975

[51] Int. Cl.² ............................................. H02G 3/08
[52] U.S. Cl. ................................ 174/65 R; 220/3.94
[58] Field of Search ................. 174/65 R; 220/3.92, 220/3.94

[56] References Cited

U.S. PATENT DOCUMENTS

| | | | |
|---|---|---|---|
| 1,591,926 | 7/1926 | Mautner | 220/3.94 |
| 2,495,584 | 1/1950 | Hook | 220/3.94 |
| 2,659,765 | 11/1953 | Dunn | 174/65 R |
| 3,384,393 | 5/1968 | Horton et al. | 174/65 R X |

Primary Examiner—J. V. Truhe
Assistant Examiner—D. A. Tone
Attorney, Agent, or Firm—Donald D. Mon

[57] ABSTRACT

An electrical junction box comprises a base and a four-sided peripheral wall with a pair of opposite tubular connectors protruding outwardly from opposite end walls and providing ingress through respective walls, into the box. The box is split into two complementary parts along a line passing through the base and the opposite end walls including the connectors. The base is hinged so that the complementary parts may pivot relative to each other from their normal position of abutment to each other to open the connectors so that conductors within a sheathed cable can be passed through the box from the connectors after severing the surrounding sheath but without severing the cable conductors, and the severed ends of the sheath can be connected to the protruding connectors. This permits making electrical connections to the conductors within the box without severing the conductors. This also provides access to the inside of the sheath to fish additional circuits into the junction box.

10 Claims, 10 Drawing Figures

U.S. Patent  Sept. 27, 1977  4,051,322
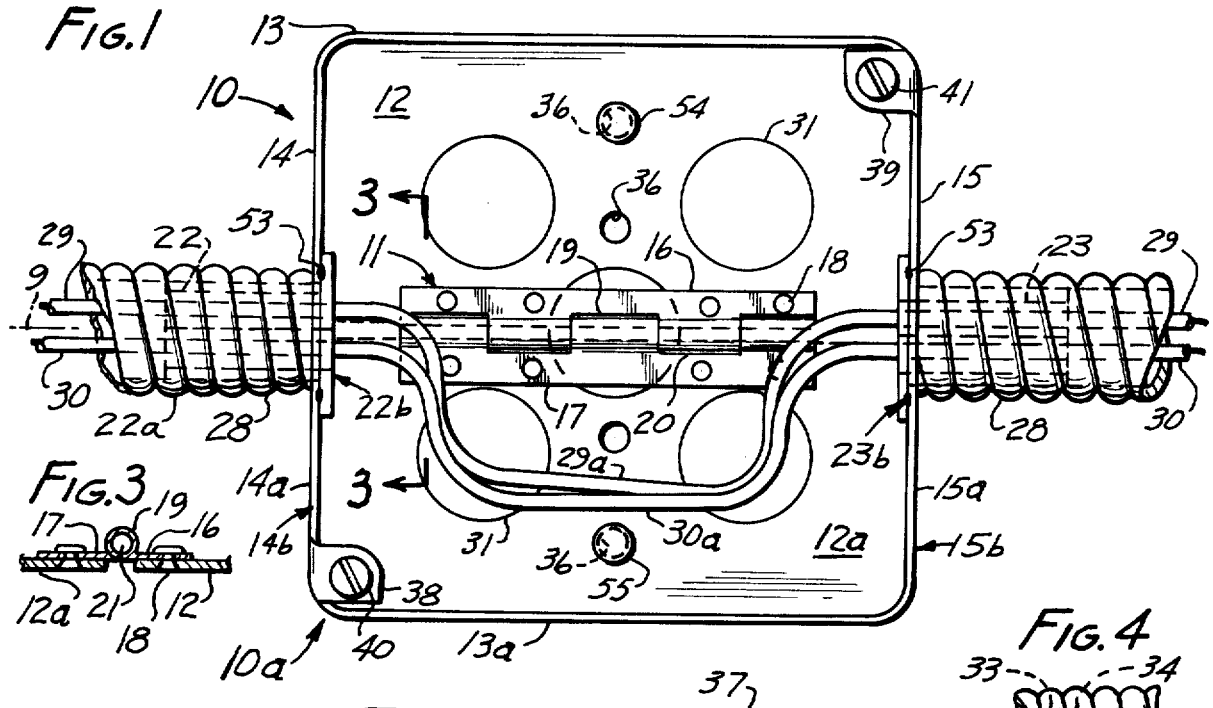
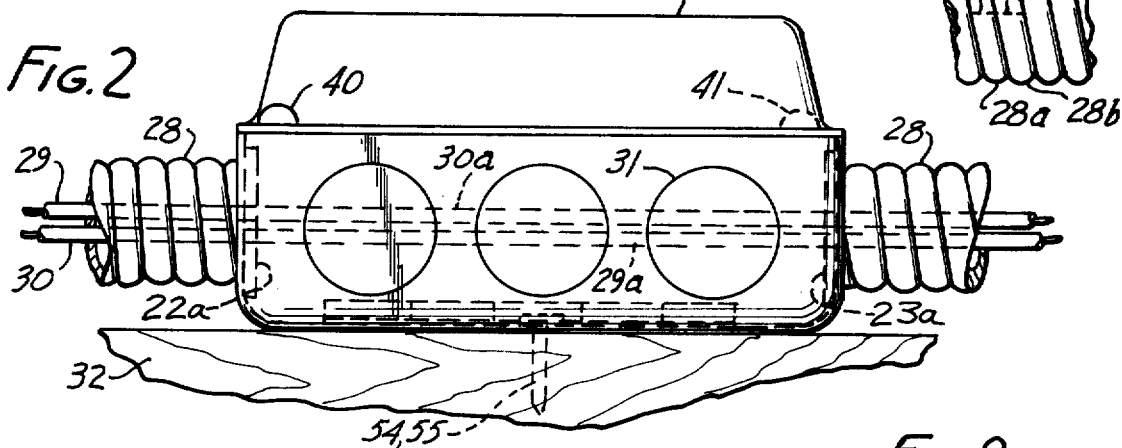
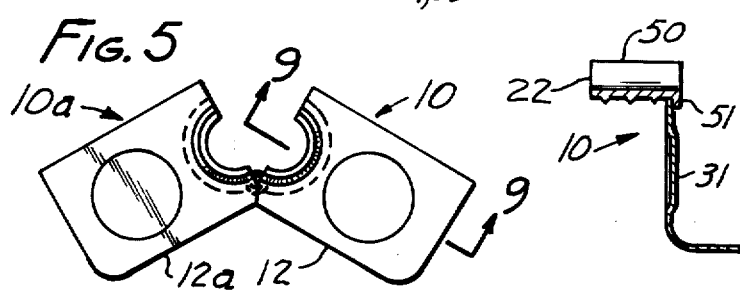
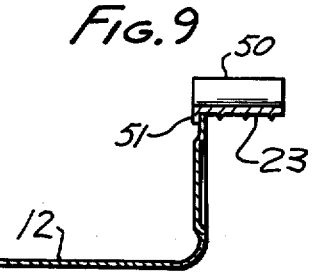
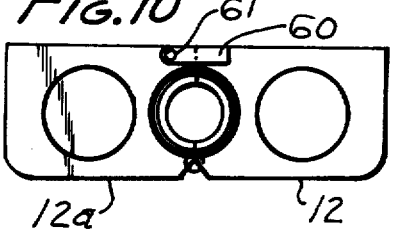
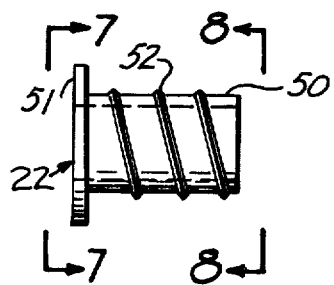
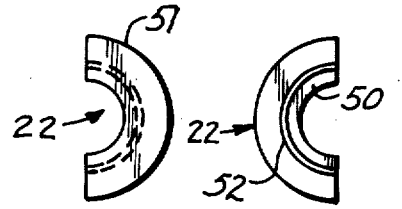

ELECTRICAL JUNCTION BOX

This invention relates to electrical junction boxes which can be incorporated into a sheathed cable without severing the enclosed conductors.

According to past general practice, when it has been desired to connect external conductors to conductors contained within a flexible sheath, ordinarily metal, a junction box has been used to contain this connecton or junction. The cable, including the flexible sheath and the conductors within it, have heretofore had to be severed, and the severed ends of these conductors have been pulled out from the severed ends of the sheath for some distance to permit inserting these conductors through openings in the wall of the box into the interior of the box, where additional connections were made. The same situation pertained when new conductors were needed in the sheath for additional circuits. When the conductors are connected, insulation has been stripped for electrical connection to the external conductors from which insulations has also been stripped from their ends. This severing of the cable's conductors has heretofore been necessary in order to get the cable's conductors into the box. In making these conductor connections the severed ends of the cable's conductors have also been connected together, along with the external conductor, in a well-known manner as by twisting the conductor ends together and maintaining the connections by suitable means such as solder or other well-known type of securing means. The severed ends of the flexible sheath have been attached to tubular connectors which protrude outwardly from opposite end walls of the junction box.

This operation of severing conductors and then reconnecting them has had two principal disadvantages, namely, the time required for the severing and reconnecting operation and also the interruption of the cable circuit during the time of the conductor severance. This invention permits a skilled electrician to work the circuit "hot", and can easily save over twenty minutes (usually much more) per installation.

An object of the present invention is to provide a junction box which does not require the severing of cable conductors in order to incorporate a new junction box into the circuit nor to bring new conductors into the new box through the existing sheath.

The invention is carried out by provision of a junction box having a base with a peripheral wall structure, wherein the box is made of two separate complementary parts, assembled to provide a complete box, the line of demarcation between the complementary parts passing through two aligned tubular connectors in opposite walls. The two complementary parts are brought together in abutment so that the parts abut each other to form a junction box. Likewise, the split parts of the tubular connectors abut each other to form complete tubular connectors. The complementary parts are connected together by hinge means so that they may pivot to open the split connectors, which when thus opened will permit unsevered conductors, which had been enclosed within a flexible sheath, to be brought through the opened connectors into the junction box after severance of the sheath and separation of the severed sheath ends a sufficient distance apart to permit this. The complementary parts may then be pivoted to close the connectors to their proper tubular form so that the respective sheath ends can be applied over the ends of the tubular connectors. The lengths of conductor between these severed ends of the sheath will then lie within the junction box. There is usually slack in the connectors sufficient to enable the electrician to pull some up out of the box so he can work the circuit hot, often without cutting the conductor. Also, he can cut the conductor, attach a fish-wire to it, pull the conductor from the other end, drawing in the fish wire, and then attach new conductors (along with the old) to the fish-wire, thereafter pulling them all into the box. This can be done at either or both sides of the new box.

Advantages in the use of this box reside in the fact that there is no need to sever the conductors to receive the new junction box. The circuitry can be worked hot, without interruption of service, if desired. Also new circuits can readily be added through the existing sheath to a new junction box.

The foregoing and other features of the invention will be better understood from the following detailed description and the accompanying drawings of which:

FIG. 1 is a plan view of a junction box according to this invention, shown in its normal closed position and without a cover plate and with parts of a flexible cable attached to the box;

FIG. 2 is an elevation view of the junction box of FIG. 1 provided with a cover plate;

FIG. 3 is a cross-section view showing a detail taken at line 3—3 of FIG. 1;

FIG. 4 shows a length of cable sheath, showing where it may be severed for use with a junction box according to this invention;

FIG. 5 is a side view showing the box opened to receive the conductors;

FIGS. 6, 7 and 8 are side, left-hand and right-hand views of part of a connector used in this invention;

FIG. 9 is a cross-section taken at line 9—9 of FIG. 5; and

FIG. 10 is a side view of a modified junction box according to the invention.

Referring to the embodiment shown in FIGS. 1 through 9, the junction box, ordinarily of metal, is made in two complementary parts 10 and 10a of equal dimensions, joined to each other by a hinge 11. The respective box parts 10 and 10a comprise base parts 12 and 12a, side walls 13 and 13a upstanding from the base, and end wall parts 14, 14a and 15, 15a, (forming end walls 14b and 15b respectively) respectively also upstanding from the base. The end wall parts 14 and 15 integrally join the ends of side wall 13 and the end wall parts 14a and 16a integrally join the ends of side wall 13a. The hinge 11 may be of the usual piano hinge type having a hinge member 16 attached to base part 12 and another hinge member 17 attached to base part 12a by suitable means such as rivets 18. Also, the flange may comprise loops cast integrally with the box, joined to a hinge pin.

The respective hinge members are provided with conventional curls 19 and 20 respectively, aligned so that a conventional hinge pin 21 extends parallel to the abutting straight edges of the base parts 12 and 12a. There is thus assembled a box having a base composed of the two abutting base parts 12 and 12a and in which the respective wall parts 14, 14a can be abutted and wall parts 15, 15a can be abutted to a closed ("normal") position illustrated in FIG. 1. Alternatively they may be pivoted on the hinge to the open position shown in FIG. 5. The hinge is directly connected to the base parts. However it is also connected to and related to the end walls through the base parts, the base parts and end wall parts being connected to one another. Thus, the hinge means is connected to the end walls and enables the end wall parts and the connector parts (yet to be described) to pivot relative to one another.

The end wall parts and the connector parts abut one another at the plane defined by line 9 in FIG. 1 which plane is normal to the base comprised of base parts 12 and 12a.

According to conventional practice, the junction box contains a number of circular "knock-out" seals 31 at positions through the base, side walls and end walls for the purpose of bringing exterior conductors into the box through one or more of the holes left after knocking out the corresponding seals.

Provision is made at the end walls for tubular connectors by which sheathing may be attached to the box. For this purpose the respective end wall parts 14 and 14a are provided with complementary parts 22 and 22a of a tubular split connector 22b and similarly the opposite end wall parts 15 and 15a are provided with complementary parts 23 and 23a of another tubular split connector 23b. Thus these tubular connectors are split connectors, the plane of the split being the same for both connectors and extending longitudinally through the box and along the abutment of the two base parts. These parts are conveniently made indentical to one another, and are formed as halves of the total connector. Because they are identical, only part 22 will be discussed in detail.

FIGS. 6-8 illustrate part 22. The part has a half cylindrical wall 50 and a base flange 51. A helical thread fragment 52 is formed on the convex side of wall 50. A convenient means to attach the part to the box is by spot-welding as shown schematically at 53 (FIG. 1). The spot weld joins the flange to the inside of the side wall of the box. When the parts are abutted with the box closed, the thread fragments form a thread which matches the pitch of a conventional "flex" sheath so the flex can be snapped over, or threaded onto it, and thereby is engaged to the junction box.

It will be observed that the split connectors are attached to the end walls and project from them. The end wall parts are shaped to pass the conductors received by the connectors. In the illustrated embodiment they do this by receiving the connector parts themselves, the base flanges being mounted on the inside of the end wall parts. Nails 54, 55 may be driven through holes 36 in the base of the box to hold the box closed and also to mount it to a base such as a joist or girder. This nailing operation will be done after the conductors are placed in the opened tubes, and will be enclosed in the tubes when the box is closed as shown.

A conductor or cable is shown in FIGS. 1 and 2 of the drawing. A flexible metallic sheath 28 is shown as containing two such insulation-covered conductors 29 and 30.

In accordance with an important use for this junction box it is assumed that the cable sheath 28 containing its conductors such as conductors 29 and 30 is already installed in a building along or near a joist 32 as shown in FIG. 2, and that it is now desired to ring up to this cable additional conductors for electrical connection with conductors within the cable sheath 28. This may readily be done by use of a junction box according to this invention in the following manner:

Assuming that the sheathing 28 is constructed of two adjacent spiral strips 28a and 28b (FIG. 4) to create the spiral, two adjacent spiral turns will be severed transversely along the dotted lines 33 and 34. This will generally cause the severed ends to move apart for several inches, which is approximately the distance between ends walls 14 and 15 of the box, due to the spring tension by which the spiral sheathing is manufactured. If they do not spring apart to this extent they may be pulled apart. This will accordingly leave this interval of several inches in which the insulated conductors of the cable are exposed. In this situation the uncovered junction box is pivoted open to the position shown in FIG. 5 which will allow the unsheathed lengths of the conductors to be placed into the box in the position shown in FIG. 1, leaving the severed ends of the flexible sheath outside the box. The end walls 14b and 15b, and the split connectors 22b and 23b will be open, their opposed parts pivoting away from one another so that a conductor can be received by them laterally without cutting i.e., sidewardly without cutting or "threading" the conductor through a closed-wall tube. The box will then be closed on its hinge to the position shown in FIGS. 1 and 2, which will close the tubular connectors to their normal tubular condition so that the severed ends of the sheath may be placed over the parts of the respective tubular connectors which protrude outwardly from the box. Turns of the flexible sheathing strips can be sprung into the spaces left by thread fragments 52 of the connectors to hold the ends of the sheathing to the respective connectors as shown in FIG. 1. If greater ease of working of the unsheathed lengths of conductors within the box be desired, it is possible with this type of cable to pull some more length of conductors from the sheathing at both sides of the box to form loops of the unsheathed conductor as shown at 29a and 30a in FIG. 1.

The electrical connections may be simply made by stripping insulation off the conductors at positions 29a and 30a and attaching the ends of such conductors as are brought into the box for connection. The connections may then be soldered, or otherwise secured, if desired, and taped up for insulation in a well-known manner. Following the making of the connections the box may be covered in a well-known manner by a cover plate 37, shown in FIG. 2. For this purpose, the box is generally formed with lugs 38 and 39 (FIG. 1) threaded to receive screws 40 and 41 for holding the cover to the box. The cover may be of solid metal without any outlet, as is shown in FIG. 2 or alternatively it may contain an outlet socket to receive a plug inserted from outside the cover in a well-known manner, in which case the electrical connections made at the conductor portions 29a and 30a will be connected to the socket in a well-known manner, instead of passing out of the box through one of the holes 31.

FIG. 10 shows other means for holding the box closed. A tab 60 extends from one of the side walls and overlaps the adjacent wall when the box is closed. A screw 61 is passed through a hole in the tab and threaded into the adjacent wall. This is a more positive closure and if the threads of the screw engage both the tab and the adjacent wall, a conductive contact is made with both the wall segments.

From the foregoing description it is seen that use of a junction box according to this invention facilitates the marking of circuit connections. It also facilitates the fishing through of an additional conductor or conductors through the sheath to be attached to the junction box. Such additional conductors may be connected to the original cable conductors in the same way described for connections to external conductors.

The base of the junction box has been illustrated as substantially square or rectangular, the term "rectangular" used herein including square. It will be recognized that some modification of the shape of the base may be used, if desired provided that there is a split wall at two opposite ends where the parts of the split connector will move apart from one another when the box is hinged open.

It will be observed that other "parting lines" than the one shown can be used, although the arrangement shown is the best mode and by far the most advantageous. In any event, there must be a division or parting along the connectors which can be opened to receive uncut conductors, and which can be closed to encircle them.

It will be understood that the embodiments of the invention illustrated and described herein are given by way of illustration and not of limitation, and that modifications or equivalents or alternatives within the scope of the invention may suggest themselves to those skilled in the art.

We claim:

1. An electrical junction box comprising a base formed of two base parts with a peripheral wall structure, including opposite end walls each comprising a pair of end wall parts joined to the periphery of the base, and a pair of opposite tubular split connectors attached to and projecting from said opposite end walls for attaching to a cable sheath, said end walls being split in a plane through the connectors, one of said connector parts being attached to each of said end wall parts and hinge means connected and related to the end walls permitting the end wall parts to pivot relative to each other from a normal position in which the parts of the respective end walls and connectors are in abutment, to another position in which said parts separate from each other so that the tubular connectors become open laterally to receive a conductor, said end wall parts being shaped to provide an opening for said conductors.

2. A junction box according to claim 1 in which said plane passes through the base and the base is split at said plane, thereby providing two complementary base parts abutting each other at said plane, and the hinge means is at the base so that the complementary base parts pivot relative to each other, thereby producing said pivoting of the end walls.

3. A junction box according to claim 2 in which said plane is perpendicular to the base.

4. A junction box according to claim 3 in which the box has a cover which fastens to a part of the box at each side of the hinge means, thereby maintaining the base in its normal position.

5. A junction box according to claim 3 in which the hinge means has a pin which lies within the box when the box is in its normal position so that the bottom of the base can rest flush against a supporting structure.

6. A junction box according to claim 2 in which said base has means for attaching it to a supporting structure so that the base is maintained in its normal position.

7. A junction box according to claim 1 in which each of the connector parts comprises a base flange and a half-cylindrical wall, the base flange being attached to a respective end wall part.

8. A junction box according to claim 7 in which the base flange is attached to the inside of a respective said end wall part, the half-cylindrical wall passing through said end wall.

9. A junction box according to claim 8 in which a thread fragment is formed on the outside of each said half-cylindrical wall.

10. A junction box according to claim 8 in which the end wall parts and the connector parts abut at said plane when the box is closed.

* * * * *